C. F. BASS.
CORN PLANTER.
APPLICATION FILED DEC. 3, 1909.
974,851.
Patented Nov. 8, 1910.
3 SHEETS—SHEET 1.
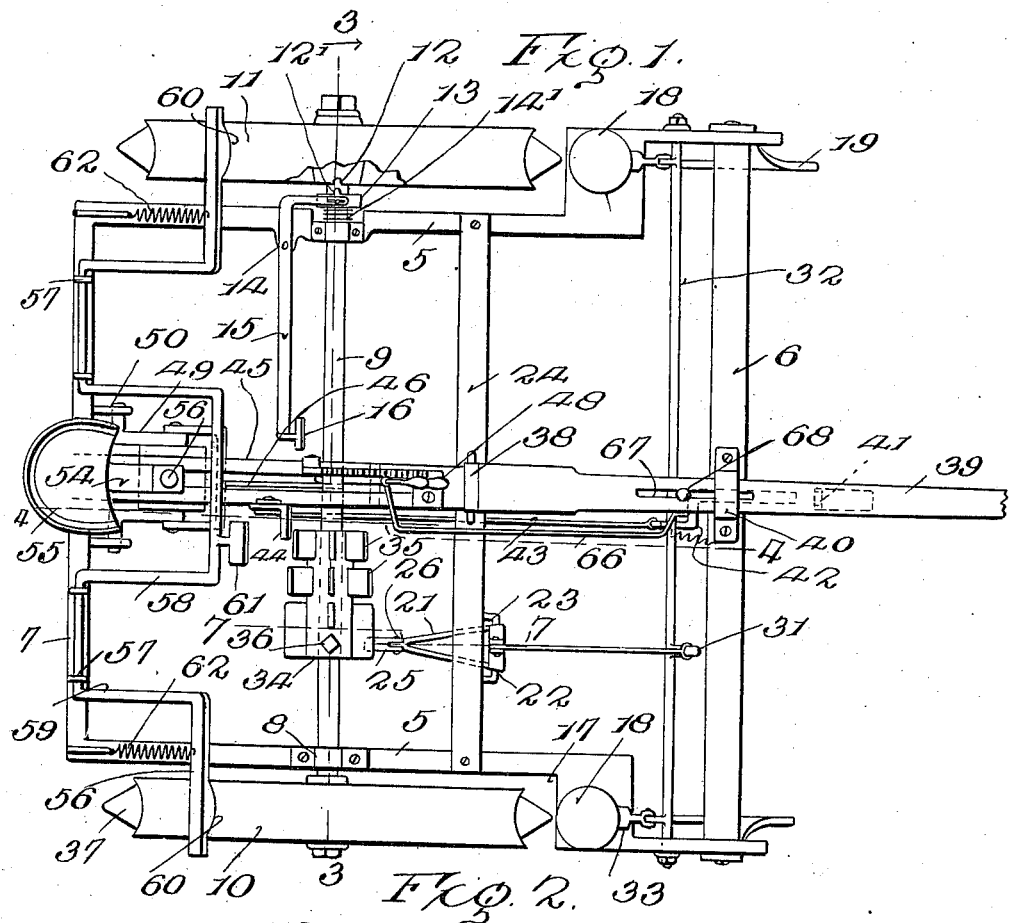
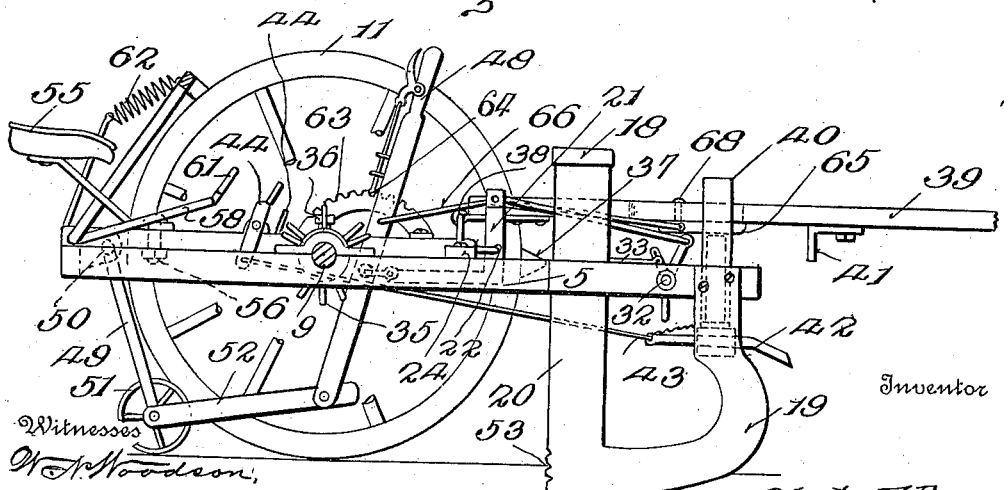

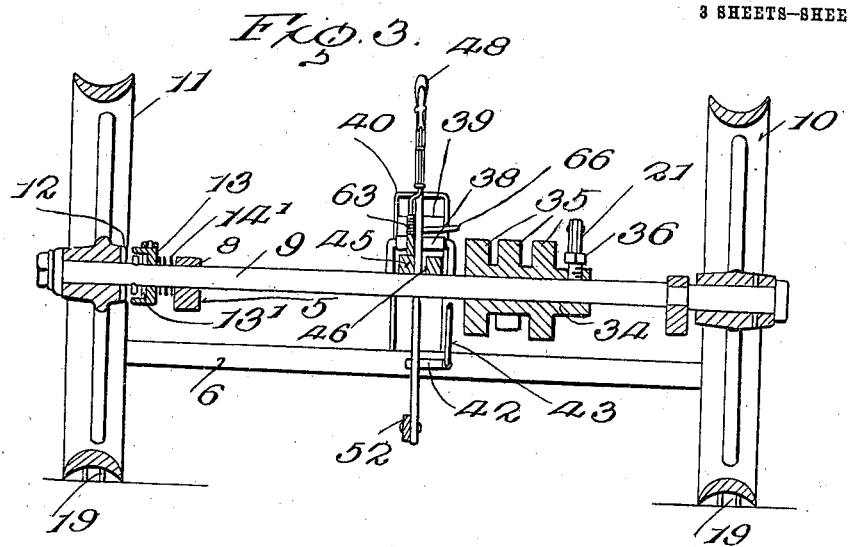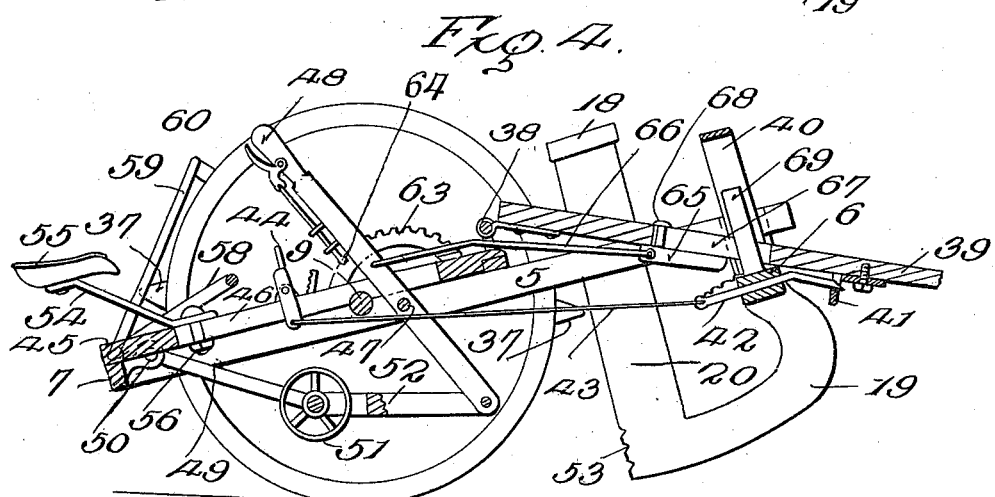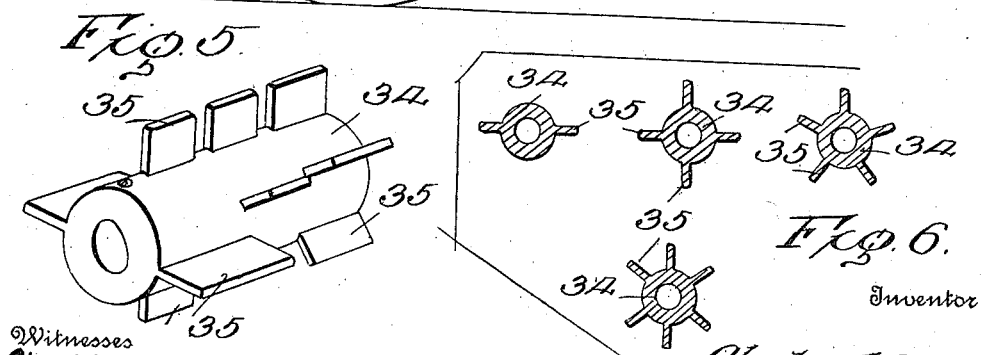

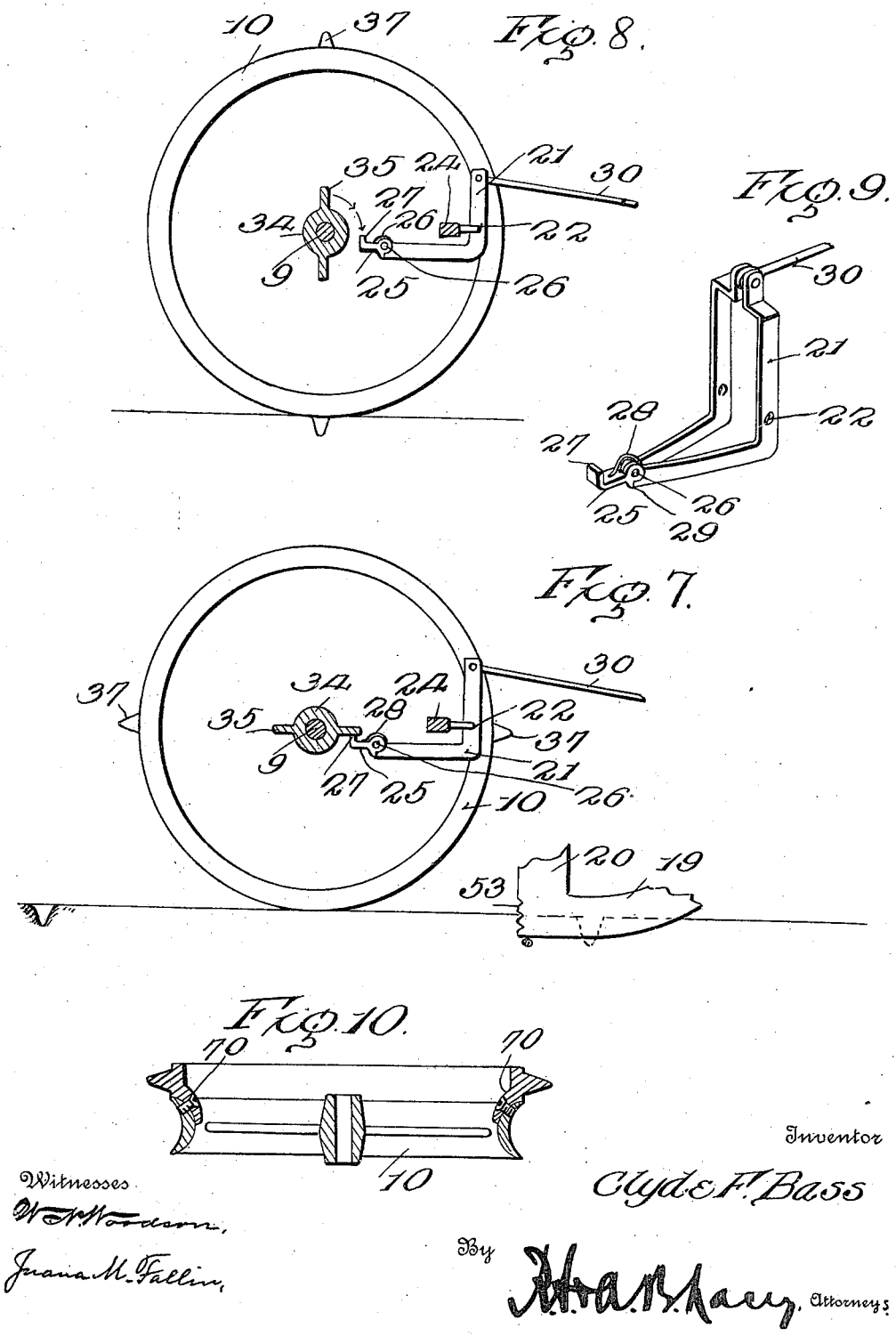

UNITED STATES PATENT OFFICE.

CLYDE F. BASS, OF STRAFFORD, MISSOURI.

CORN-PLANTER.

974,851. Specification of Letters Patent. Patented Nov. 8, 1910.

Application filed December 3, 1909. Serial No. 531,205.

*To all whom it may concern:*

Be it known that I, CLYDE F. BASS, citizen of the United States, residing at Strafford, in the county of Greene and State of Missouri, have invented certain new and useful Improvements in Corn-Planters, of which the following is a specification.

This invention relates to corn planters and has for its object the provision of a strong, durable and thoroughly efficient machine of this character, the construction of which is such that corn and other grain may be planted in straight rows without the employment of the usual check wires.
A further object is to provide a wireless check row corn planter having a collar or sleeve slidably mounted on the axle thereof and provided with a plurality of sets of radiating lugs or projections adapted to register with the trip device of the seed dropping mechanism, thus to permit the machine to be used either for planting corn in checks or for drilling grain.

A further object is to provide means for regulating the depth of the runners, and means for indicating said depth.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a top plan view of a wireless check row corn planter constructed in accordance with my invention; Fig. 2 is a side elevation of the same showing the furrow openers or runners embedded in the ground, one of the side wheels being omitted; Fig. 3 is a transverse sectional view taken on the line 3—3 of Fig. 1; Fig. 4 is a longitudinal sectional view taken on the line 4—4 of Fig. 1 showing the carrying wheel and furrow opener or runner elevated; Fig. 5 is a perspective view of the adjustable collar detached; Fig. 6 represents detail transverse sectional views of the collar; Fig. 7 is a transverse sectional view taken on the line 7—7 of Fig. 1 showing the lugs on the collar engaging the trip device, portions of the operating mechanism being omitted; Fig. 8 is a similar view showing one of the lugs in position to engage the trip device; Fig. 9 is a perspective view of the trip device detached; Fig. 10 is a transverse sectional view of a truck wheel showing a modified form of marking lug.

Corresponding and like parts are referred to in the following description and indicated in all the views of the drawings by the same reference characters.

The improved corn planter forming the subject matter of the present invention comprises a wheeled truck including a supporting frame formed of side bars 5 connected by front and rear end bars 6 and 7. Journaled in suitable bearings 8 on the side bars 5 of the wheeled truck, is an axle 9 carrying the ground wheels 10 and 11, one of said ground wheels 10 being rigidly secured to the axle 9 and the other wheel 11 being provided with a clutch member 12 which engages a corresponding clutch member or collar 13 slidably mounted on the axle 9 so that the wheel 11 may be keyed to the axle 9 or permitted to revolve loosely thereon when making a turn. Suitable lugs 12' are secured to the axle 9 and adapted to enter corresponding sockets 13' in the clutch member or collar 13 when the active face of the latter engages the clutch member 12, thus to key the collar to the axle and the wheel 11 to said collar.

Pivotally mounted at 14 is a lever 15 having one end thereof engaging the clutch member 13 and its other end provided with a foot piece 16, there being a coil spring 14' interposed between the clutch member or collar 13 and bearing of the axle 9 so that the operator by pressing against the foot piece 16 may engage or disengage the clutch members 12 and 13.

The side bars 5 of the supporting frame are preferably offset at 17 so as not to interfere with the adjacent ground wheels 10 and 11, there being suitable feed hoppers 18 mounted on the offset portion of the frame and provided with the usual slides or seed dropping mechanism (not shown).

Depending from the side bars 5 at the forward end of the supporting frame, are shoes or runners 19 having spouts 20 through which the corn or other grain passes and is deposited on the ground, when the trip device of the seed dropping mechanism is actuated. The trip device is preferably in the form of a bell crank lever 21, pivotally mounted at 22 on a loop or staple 23 extending laterally from an intermediate brace 24, the latter being secured in any suitable manner to the supporting frame, as shown. The long arm of the bell crank lever 21 extends beneath the intermediate brace 24 and is provided with a terminal finger 25, one end of which is pivotally mounted at 26 on said bell crank lever, while the other end thereof is provided with an upstanding ear 27, there being a spring 28 disposed at the pivot point 26 for normally holding the shoulder 29 on the finger 27 in contact with the adjacent end of the bell crank lever thus to cause said finger to be yieldably supported in a horizontal plane. Pivotally connected with the short arm of the bell crank lever is one end of a rod 30, the other end of which is connected to a crank arm 31 on an actuating rod 32. The actuating rod 32 is connected in any suitable manner with the slides 33 of the seed dropping mechanism so that as the rod 32 is oscillated, the corn or grain in the hoppers 18 will be fed in predetermined quantities through the spouts 20 to the ground.

Slidably mounted on the axle 9 is a sleeve or collar 34 having a plurality of spaced sets of radially disposed lugs 35 secured thereto and adapted to successively register with the trip finger 25 for the purpose of tilting the bell crank lever 21 and effecting the feeding of the corn through the spouts 20 when the planter is in operation. The lugs 35 are disposed in staggered relation, the first set comprising two lugs, the second set four lugs, the third set five lugs, and the fourth set six lugs, so that by adjusting the collar or sleeve 34 longitudinally of the axle until either set of lugs register with the trip device, the machine may be used for planting corn or other grain in checks or for drilling the grain. In order to lock or secure the collar 34 in adjusted position on the axle 9, there is provided a set screw 36, which latter passes through the collar 34 and bears against the axle, as best shown in Fig. 3 of the drawings.

The rims of the ground wheels 10 and 11 are preferably concavo-convex in cross section, said rims being provided with one or more lugs 37 for the purpose of marking the ground and thus indicating where the corn or grain is planted. The number of lugs on the wheels of the truck corresponds to the number of lugs on the collar 34, that is to say, when the first set of lugs on the collar 34 are in operation for planting the corn at a certain distance apart, but two lugs will be secured to the ground wheels.

Pivotally mounted at 38 on the transverse bar 24, is a draft tongue 39 having its intermediate portion projecting through a loop or keeper 40 carried by the end bar 6.

Fastened to the lower face of the tongue 39, is a keeper 41 adapted to receive the adjacent end of a spring actuated catch 42 for the purpose of locking or holding the tongue 39 in the position shown in Fig. 4 of the drawings, that is to say with the runners 19 elevated above the ground. A rod 43 forms a connection between the catch 42 and a foot lever 44 pivotally mounted on the supporting frame so that by depressing the lever 44, the catch 42 may be released from the keeper 41, and thus permit the tongue to be returned to horizontal position.

Disposed at the rear of the machine and connected in any suitable manner to the rear end bar 7 and intermediate bar 24, is a longitudinally disposed bar 45 having a slot 46 formed therein and in which is mounted at 47 a main operating lever 48.

Depending from the rear of the supporting frame is a crank arm or hanger 49 having its opposite ends journaled on the supporting frame at 50 and its intermediate portion provided with a carrying wheel or roller 51, there being a plate or link 52 forming a connection between the lower end of the lever 48 and the hanger 49, as shown so that by moving the operating lever 48 in the direction of the hoppers 18, the carrying wheel 51 will be swung downwardly into engagement with the ground, while the runners 19 will be embedded in the surface of said ground, the depth of penetration of the runners being indicated by suitable notches or graduations 53 formed on the shoes 19, as best shown in Fig. 2 of the drawings.

Mounted for longitudinal movement on the slotted bar 45, is a bracket 54 carrying a seat 55, said seat being secured in adjusted position by a bolt or similar fastening device 56 extending through the slot 46 in the longitudinal bar 45.

Mounted in suitable bearings 57 on the rear end bar 7 of the supporting frame, is a crank rod 58 having oppositely disposed arms 59 on which are mounted suitable scraping elements 60, the function of which is to remove any dirt or mud adhering to the lugs 37 and rim of the ground wheels during the planting operation. A foot piece 61 is secured to the rod 58 at a point adjacent the seat 55 so that by pressing on the foot piece 61, the rod 58 may be oscillated against the tension of the springs 62, thus to cause the scrapers 60 to engage the rims of the wheels, the springs 62 serving to automatically release the scrapers when the foot is removed from the member 61.

Thus it will be seen that by moving the operating lever 48 in the direction of the hoppers 18, the carrying wheel 51 will be pressed against the surface of the ground, thus tilting the forward end of the truck frame downwardly and causing the shoes or runners 19 to be embedded in the ground, as best shown in Fig. 2 of the drawings. As the machine is caused to travel over the surface of the ground, the lugs 35 on the adjustable collar 34, intermittently engage the trip device 21 and cause the seed or grain in the hoppers to be fed at predetermined intervals into the furrow or hill formed by the runners 19, as before stated. When the operating lever 48 is moved in the direction of the rear end bar 7 of the supporting frame, the carrying wheel 51 will be elevated so as to cause the truck wheels 10 and 11 to bear against the ground, the shoes or runners 19 assuming the position shown in Fig. 4 of the drawings when a rearward pull is exerted on the operating lever 48. As the shoes or runners 19 are elevated, the catch 42 will engage the keeper 41 on the tongue 39 and hold the latter in the position shown in Fig. 4 so that the machine may be transported from one part of a field to another without danger of the shoes coming in contact with the ground. It will of course be understood that prior to operating the lever 48 to lower the runners 19, the foot lever 44 will be actuated to release the catch 42 so as to permit the forward portion of the frame carrying the runners 19, to be moved downwardly in contact with the ground. If desired however, the rod 42 instead of being connected with the foot lever 44 may be connected with the operating lever 48, in which event, the lever 48 will serve the dual function of raising and lowering the carrying wheel 51 and releasing the catch 42.

A rack 63 is secured to the supporting frame for engagement with a pawl 64 carried by the operating lever 48, such a construction permitting the carrying wheel or roller 51 to be locked in either raised or lowered position.

In order to prevent the shoes or runners 19 from being forced out of the ground should the carrying wheel or roller 51 strike an obstruction or enter a hole or depression, there is provided a filling block or auxiliary locking member 65, the latter being slidably mounted on the lower face of the tongue 39 and connected through the medium of a rod 66 with the operating lever 48. A slot 67 is formed in the tongue 39 to permit the passage of the securing bolt 68 of the filling block 65 and also to permit the passage of a post or standard 69 when the shoes or runners 19 are tilted upwardly. The post 69 is secured to the frame of the planter between the legs of the keeper 40 and coacts with the filling block to prevent upward movement of the runners. Thus it will be seen that when the lever 48 is operated to elevate the runners the filling block 65 will be retracted to permit the catch 42 to engage the keeper 41 and when said lever is operated to lower the runners the filling block will be moved to a position beneath the post 69 and thus retain the runners in the ground.

In some cases the marking lugs 37, instead of being secured to the outer face of the rims of the ground wheels 10 and 11, may be secured to one edge thereof in which event, suitable attaching ears 70 will be formed on the lugs for engagement with the inner face of the rim of the wheel and to which they are secured by screws, bolts or similar fastening devices, as best shown in Fig. 10 of the drawings.

From the foregoing description it is thought that the construction and operation of the device will be readily understood by those skilled in the art and further description thereof is deemed unnecessary.

Having thus described the invention, what is claimed as new is:

1. A corn planter including a wheeled truck having runners, seed dropping mechanism mounted on the truck above the runners, a trip device operatively connected with the seed dropping mechanism, a collar slidably mounted on the axle of the truck and provided with a plurality of sets of peripheral lugs adapted to successively register with and engage the trip device, and means for securing the collar in adjusted position on the axle.

2. A corn planter including a wheeled truck having runners, seed dropping mechanism slidably mounted on the truck above the runners, a trip device operatively connected with the seed dropping mechanism and provided with a spring actuated finger, and a collar slidably mounted on the axle of the truck and provided with a plurality of sets of peripheral lugs adapted to successively register with and engage the finger of the trip device, and means for securing the collar in adjusted position on the axle.

3. A corn planter including a wheeled truck having runners, seed dropping mechanism mounted on the truck above the runners, a trip device operatively connected with the seed dropping mechanism, a collar slidably mounted on the axle of the truck and provided with a plurality of sets of peripheral lugs adapted to successively register with and engage the trip device, a hanger depending from the truck and provided with a carrying wheel, means for securing the collar in adjusted position on the axle, and an operating lever operatively connected with the carrying wheel for raising and lowering the latter.

4. A corn planter including a wheeled truck, runners depending from the truck and provided with graduations, seed dropping mechanism mounted on the truck above the runners, a pivoted trip device operatively connected with the seed dropping mechanism, a collar slidably mounted on the axle of the truck and provided with a plurality of sets of radiating lugs disposed in staggered relation and adapted to successively engage the trip device for operating the seed dropping mechanism, and means for clamping the collar in adjusted position on said axle.

5. A corn planter including a wheeled truck having runners, seed dropping mechanism mounted on the truck above the runners, a trip device operatively connected with the seed dropping mechanism, marking lugs secured to the rims of the truck wheels, a collar slidably mounted on the axle of the truck and provided with a plurality of sets of radiating lugs adapted to successively register with and engage the trip device, means for securing the collar in adjusted position on the axle, the position of the lugs on the collar corresponding to the position of the marking lugs on the truck wheels.

6. A corn planter including a wheeled truck, an axle journaled on the truck, ground wheels carried by the axle and having concavo-convex rims provided with marking lugs, runners depending from the front of the truck, seed dropping mechanism mounted on the truck above the runners, a trip device operatively connected with the seed dropping mechanism, a collar slidably mounted for longitudinal movement on the axle of the truck and provided with a plurality of sets of radiating lugs adapted to successively register with and engage the trip device for actuating the seed dropping mechanism, a carrying wheel depending from the rear portion of the truck and adapted when lowered to depress the runners, and means for securing the collar in adjusted position on the axle.

7. A corn planter including a wheeled truck having a draft tongue and provided with runners, seed dropping mechanism mounted on the truck above the runners, a trip device operatively connected with the runners of the seed dropping mechanism, a collar slidably mounted on the axle of the truck and provided with peripheral lugs adapted to engage the trip device, a carrying wheel depending from the truck, a lever operatively connected with the carrying wheel for moving the runners into engagement with the ground, a catch adapted to engage the tongue for supporting the runners in elevated position, and a lever for releasing said catch.

8. A corn planter including a wheeled truck having runners and provided with marking lugs secured to the wheels of said truck, seed dropping mechanism mounted on the frame above the runners, a trip device operatively connected with the seed dropping mechanism, a collar slidably mounted on the axle of the truck and provided with a plurality of sets of peripheral lugs any set of which is movable into registration with and adapted to engage the trip device, means for securing the collar in adjusted position on the axle, a scraper mounted on the frame and bearing against the wheels of the truck, a tongue pivotally connected with the frame, a carrying wheel pivotally mounted on the frame at the rear end of the truck, an operating lever connected with the carrying wheel, a keeper secured to the frame and embracing the tongue, a catch for locking the tongue against rocking movement, and a foot lever operatively connected with the catch for releasing the latter.

9. A corn planter including a supporting frame, runners and seed dropping mechanism, a tongue pivotally mounted on the supporting frame, a carrying wheel for forcing the runners into the ground, means for elevating the runners above the surface of the ground, and means carried by the runners and engaging the tongue for locking said runners in elevated position.

10. A corn planter including a supporting frame, runners and seed dropping mechanism, a tongue pivotally mounted on the supporting frame, a cross bar connecting the runners, a keeper carried by the cross bar and embracing the tongue, a carrying wheel for forcing the runners into the ground, means slidably mounted on the tongue and adapted to enter the keeper for retaining the runners in the ground, means for elevating the runners, and means carried by the cross bar and adapted to engage the tongue for supporting the runners in elevated position.

11. A corn planter including a supporting frame, runners and seed dropping mechanism, a tongue pivotally mounted on the supporting frame, a cross bar connecting the runners, a keeper secured to the cross bar and embracing the tongue, means slidably mounted on the tongue and engaging the cross bar for forcing said runners into the ground, means for elevating the runners, and means for locking the runners in an elevated position.

12. A corn planter including a supporting frame, runners and seed dropping mechanism, a tongue pivotally mounted on the frame, a cross bar connecting the runners, means slidably mounted on the tongue and adapted to engage the cross bar for holding said runners in the ground, means for elevating the runners, and means carried by the cross bar and engaging the tongue for supporting said runners in elevated position.

13. A corn planter including a supporting frame, runners and seed dropping mechanism, a tongue pivotally mounted on the supporting frame, a keeper carried by the runners and embracing the tongue, a carrying wheel, an operating lever connected with the carrying wheel for actuating the latter to force the runners into the ground, means operable by said lever and engaging the runners for holding said runners in the ground, said operating lever also serving to elevate the runners, and means carried by the runners and adapted to engage the tongue for locking said runners in an elevated position.

14. A corn planter including a supporting frame, runners and seed dropping mechanism, a cross bar connecting the runners, a tongue pivotally mounted on the supporting frame, a keeper carried by the cross bar and embracing the tongue, a carrying wheel depending from the supporting frame, an operating lever pivotally connected with the carrying wheel, a filling block slidably mounted on the tongue and movable to a position within the keeper for holding the runners in engagement with the ground, a connection between the filling block and operating lever, a keeper secured to the tongue, a catch carried by the cross bar and adapted to engage the keeper for supporting the runners in elevated position, and means for operating the catch, said filling block being movable to inoperative position when the catch engages the keeper and to operative position when the catch is released from the keeper.

In testimony whereof I affix my signature in presence of two witnesses.

CLYDE F. BASS. [L. S.]

Witnesses:
WILLIAM S. BRYANT,
MARTIN H. MAYFIELD.